United States Patent
Lamarque et al.

(10) Patent No.: US 7,022,809 B2
(45) Date of Patent: Apr. 4, 2006

(54) POLYIMIDES FOR ANCHORING LIQUID CRYSTALS, DISPLAY DEVICES INCLUDING SAME AND METHOD FOR THE PREPARATION OF SAID DEVICES

(75) Inventors: Sandrine Lamarque, Magny les Hameaux (FR); Jean-Claude Dubois, Magny les Hameaux (FR); Didier Gallaire, Orsay (FR)

(73) Assignee: Nemoptic, (FR)

( * ) Notice: Subject to any disclaimer, the term of this patent is extended or adjusted under 35 U.S.C. 154(b) by 0 days.

(21) Appl. No.: 10/479,274

(22) PCT Filed: May 30, 2002

(86) PCT No.: PCT/FR02/01815

§ 371 (c)(1),
(2), (4) Date: Nov. 25, 2003

(87) PCT Pub. No.: WO02/097524

PCT Pub. Date: Dec. 5, 2002

(65) Prior Publication Data

US 2004/0161541 A1 Aug. 19, 2004

(30) Foreign Application Priority Data

May 31, 2001 (FR) .................. 01 07137

(51) Int. Cl.
*C08G 73/10* (2006.01)
*C08G 69/28* (2006.01)
*B05D 3/02* (2006.01)

(52) U.S. Cl. ............ 528/353; 528/125; 528/126; 528/128; 528/172; 528/173; 528/174; 528/176; 528/183; 528/188; 528/220; 528/229; 528/350; 528/351; 528/26; 428/1.1; 428/1.2; 428/1.26; 428/473.5; 427/385.5

(58) Field of Classification Search ........... 528/353, 528/125, 126, 128, 172, 174, 26, 176, 183, 528/188, 220, 229, 350, 351; 428/1.26, 1.1, 428/1.3, 1.6, 473.5, 1.2; 427/385.5
See application file for complete search history.

(56) References Cited

U.S. PATENT DOCUMENTS

| 5,324,430 | A | | 6/1994 | Chung et al. |
| 5,348,835 | A | * | 9/1994 | Oba et al. .................. 430/192 |
| 5,399,664 | A | * | 3/1995 | Peng et al. ................. 528/353 |
| 5,750,633 | A | * | 5/1998 | Ohara et al. ................ 528/174 |
| 5,753,407 | A | * | 5/1998 | Oba ........................... 430/191 |
| 5,856,432 | A | | 1/1999 | Auman et al. |
| 6,066,696 | A | * | 5/2000 | Yu et al. ..................... 525/178 |
| 6,327,017 | B1 | | 12/2001 | Barberi et al. |
| 2004/0161541 | A1 | * | 8/2004 | Lamarque et al. ....... 427/385.5 |

FOREIGN PATENT DOCUMENTS

| EP | 0949533 | 4/1999 |
| FR | 00 16135 | 12/2000 |

OTHER PUBLICATIONS

"Two-Step Synthesis of Side-Chain Aromatic Polyimides for Second-Order Nonlinear Optics", Chen, T.-A; Jen, A. K.-Y; Cal. Y; Macromolecules; 1996, 29(2); 535-539.*
"Synthesis and Properties of Nonlinear Optical Side Chain Soluble Polyimides for Photonics Applications", H. Lee, et al., Journal of Polymer Science; Part A, vol. 36, pp. 3010307.
"Two-Step Synthesis of Side-Chain Aromatic Polyimides for Second-order Nonlinear Optics", T. Chen, 1996 American Chemical Society, pges535-539.

* cited by examiner

*Primary Examiner*—P. Hampton Hightower
(74) *Attorney, Agent, or Firm*—Blakely, Sokoloff, Taylor & Zafman

(57) ABSTRACT

The present invention relates to novel polyimides derived from 6FDA and from 3,3-dihydroxy-4,4'-diaminobiphenyl and novel polyimides derived from PMDA and from Bis-AP-AF, having alkyl, arylalkyl, heteroarylalkyl, (cycloalkyl) alkyl, fluoroalkyl or siloxane side groups.

The present invention also relates to a method of producing nematic liquid-crystal devices, which comprises the steps consisting in:
 depositing one of the polyimides according to the invention on a substrate;
 annealing the polyimide in one or more steps; and
 defining an azimuthal orientation of the polyimide coating.

16 Claims, 1 Drawing Sheet

POLYIMIDES FOR ANCHORING LIQUID CRYSTALS, DISPLAY DEVICES INCLUDING SAME AND METHOD FOR THE PREPARATION OF SAID DEVICES

The present patent application is a non-provisional application of International Application No. PCT/FR02/01815, filed May 30, 2002.

The present invention relates to the field of liquid-crystal display devices. More specifically, the principle object of the present invention is to provide novel polymers for anchoring liquid-crystal molecules in display cells.

Liquid-crystal display devices generally comprise two confining plates or substrates provided with electrodes on their internal surface and a liquid-crystal material placed between the two plates. Moreover, means are provided on the confining plates for ensuring and controlling the anchoring of the liquid-crystal molecules.

A person skilled in the art knows in particular how to orient the nematic liquid crystals either perpendicular to the surface of the substrate (this orientation is called homeotropic) or parallel to the surface (this orientation is called planar) by means of surface treatments such as polymer coatings.

Even more specifically, "twisted nematic" liquid-crystal displays require strong planar, or rather slightly oblique, anchoring. This strong planar anchoring is usually obtained according to the prior art by depositing oriented polymers or by evaporating SiO at a given angle.

Another family of nematic liquid-crystal displays has recently appeared (Patent WO-97/17632), namely the family of surface-breaking nematic displays. They allow bi-stability and hence a display which remains indefinitely without consumption of energy; only the switching between the two states requires an energy supply. Another advantage of bistability is the possibility of high definition, since the number of lines of the display is a function only of the ratio of the time when the information has to be changed to the time to write a line. Line numbers greater than 10,000 may also be produced. The major difficulty in producing this type of display is associated with the need to break the anchoring on the surface: it is necessary to have reproducible low-energy anchoring. The present invention is principally useful in the production of this type of display.

A typical example of a bistable nematic display using weak anchoring is described in the document WO 97/17632. According to that document, the liquid crystal is placed between two glass plates coated with a conducting layer of mixed indium tin oxide (known as ITO glass). One of the electrodes bears a coating giving strong planar or oblique anchoring and the other electrode carries a coating giving planar monostable anchoring of low zenithal anchoring energy and medium or strong azimuthal anchoring energy. Two polarizers are furthermore placed on either side of the cell with a suitable orientation.

The principle of this "bistable" technology is based on the presence of two stable states with no electric field applied—a uniform state and a 180° twisted state. These two states correspond to minimum energy levels. They are balanced using a nematic liquid crystal of positive dielectric anisotropy, for example pentylcyanobiphenyl (known by the name 5CB) doped with a chiral additive.

The display technology uses the possibility of breaking the weak planar anchoring and the persistence of the strong planar anchoring to pass from one state to the other by applying an electric field of specific shape and intensity. This field, perpendicular to the cell, induces a homeotropic texture similar to the "black" state of TN technology, but in which the molecules close to the low-energy anchoring surface are perpendicular to the latter. This off-equilibrium texture is the transition state, which allows switching to one of the two stable states. On removing the field, this texture will be converted to one or other of the stable states depending on whether the elastic coupling effects or the hydrodynamic coupling effects have been favored.

Various means have already been proposed to ensure the anchoring of liquid-crystal materials.

However, it proves to be very difficult to identify completely satisfactory means because of the numerous constraints with which these anchoring means must comply.

A person skilled in the art knows in particular that anchoring polymers must: 1) be soluble in a medium in order to be suitably applied to the receiving plate or substrate, so as to wet and cover the latter suitably; 2) be capable of making the plate or substrate anisotropic; 3) be insoluble in the liquid-crystal material; and 4) define an anchoring giving the required orientation and required energy.

Furthermore, although at the present time means capable of defining satisfactory strong anchoring exist, there are only very few means capable of ensuring weak anchoring (this concept will be explained below).

The object of the present invention is thus to provide novel means capable of defining low-energy anchoring.

This object is achieved within the context of the present invention thanks to a process for preparing liquid-crystal cells, which comprises:

depositing, on a substrate, a polymer based on a polyimide having lateral groups, of formula (I) or of formula (II) (said formulae being presented below);

thermally treating the polymer at a predetermined temperature; and ensuring controlled orientation of the polymer.

The object of the present invention is also novel polyimides of formula (I) and of formula (II).

The present invention makes it possible to produce low-energy anchoring (alignment) layers in liquid-crystal display cells, especially bistable nematic liquid-crystal cells.

The present invention also relates to the devices thus obtained.

The terms "strong anchoring" and "weak anchoring" may be defined according to the developments described in Patent application FR 00/16135.

These developments are summarized below.

The molecular anchoring of the liquid crystal has its origin in the anisotropy of its interactions with the orientation layer. The molecular anchoring may be characterized by its effectiveness and by the direction imposed on the liquid-crystal molecules in the absence of any other external influence. This direction, called the easy axis, is described by the unit vector $\vec{n}_0$ or by the zenithal angle $\theta_0$ and azimuthal angle $\phi_0$ in the Cartesian system of coordinates having the z axis perpendicular to the surface of the substrate.

If the easy axis of the liquid-crystal molecules is perpendicular to the substrate, the alignment is homeotropic. If it is parallel to the substrate, the alignment is planar. Between these two cases, there is what is called oblique alignment, described by the zenithal anchoring angle defined with respect to the normal to the surface of the substrate, or by its complement called the tilt (or pretilt) angle.

The zenithal anchoring energy may be measured by a simple method described below, namely the measurement of the critical field to break the anchoring.

In a liquid-crystal cell, it is known that it is possible to "break" the surface anchoring by using an electric field $E>E_c$ normal to the plates, applied to a nematic liquid crystal of positive dieletric anisotropy. For increasing E, approaching $E_c$, the angle $\theta_s$ of the surface molecules rapidly switches from 90° to 0°; this corresponds to a detectable variation in the birefringence of the cell. Above $E_c$, the angle $\theta_s$ remains 0—the surface is called "broken".

The critical field $E_c$ to break the anchoring is defined by the equation $$E_c = \frac{1}{L_z} \sqrt{\frac{K}{\epsilon_0 \epsilon_a}}$$

where K is the curvature elasticity (~10 pN) and $L_z$ is the extrapolation length defining the zenithal anchoring energy, which is written:

$$W_z = (½) (K/L_z) \cos^2 \theta_s$$

$\theta_s$ being the angle of the surface molecules.

For zenithal anchoring, the anchoring is considered to be strong if $L_z<20$ nm ($E_c>20$ V/μm) and weak if $L_z \geq 40$ nm ($E_c<10$ V/μm). Azimuthal anchoring has a weaker order of magnitude. Independently of the zenithal anchoring, the azimuthal anchoring is considered to be strong if $L_a<100$ nm.

To produce a bistable cell by breaking the anchoring, the anchoring surface must exhibit relatively low zenithal anchoring energy (for example $L_z \geq 40$ nm) and relatively strong azimuthal anchoring ($L_a<<d$, the thickness of the cell). Within the context of the present invention, low-energy zenithal anchoring is obtained by depositing specially chosen polymers based on a polyimide having side groups which undergo a series of specific treatments.

The polyimide-based anchoring layer is deposited from a polymer solution by spin coating. After the solvent has evaporated, a polymer layer with a typical (but nonlimiting) thickness of between a few nanometers and 100 nm is obtained.

Next, the polymer layer is preferably rubbed, by a fabric roll of the prior art, in order to impose an azimuthal orientation of the liquid crystal.

The polymers and copolymers forming the subject matter of the invention are derivatives of polyimides of formulae (I) and (II) substituted with lateral groups.

Hyung-Jong Lee et al. have described, in Journal of Polymer Science Part A, Vol. 36, 301–307 (1998), the synthesis of polyimides derived from the anhydride 6-FDA, said polyimides being substituted with conventional chromophoric side groups of the DR1 and DANS type. These polyimides, which possess nonlinear optical properties, are very soluble in organic solvents.

The first type of polyimide according to the invention is a polyimide derived from 2,2'-bis(3,4-dicarboxyphenyl) hexafluoropropane dianhydride (6FDA) and from 3,3'-dihydroxy-4,4'-diaminobiphenyl of formula I:

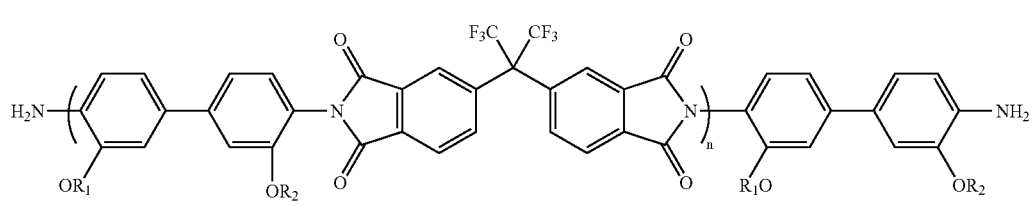

(I)

in which the radicals $R_1$ and $R_2$, which are different or identical, represent an alkyl, (cycloalkyl)alkyl, arylalkyl, heteroarylalkyl, fluoroalkyl or siloxane radical.

The term "alkyl" denotes alkyl groups having a linear or branched chain such as, for example, the ethyl, butyl or octyl group.

The term "cycloalkyl" denotes a monocyclic or polycyclic alkyl having 3 to 16 carbon atoms, which may be substituted with a functional group. As examples, mention may be made of bicycloalkyl groups such as adamantyl groups.

The term "aryl" denotes a mononuclear or polynuclear aromatic group preferably having 6 to 16 carbon atoms. As an example, mention may be made of the phenyl or napthyl group, which may be substituted with one or more substituents.

The term "heteroaryl" denotes within the context of the present invention a mononuclear or polynuclear heteroaromatic group preferably having 5 to 16 carbon atoms and from 1 to 4 heteroatoms, preferably nitrogen, oxygen and sulfur atoms. As examples, mention may be made of the pheryl, pyraline, tetrazoline, pyridine and carbazoline groups.

Within the context of the present invention, the following radicals are preferred: a linear or branched $C_8$ to $C_{18}$ alkyl, or a phenyl alkyl, or particularly n-octyl, n-dodecyl, n-octadecyl, 2-cyclohexyl ethyl, 2-(ethyl) hexyl, 8-(phenyl) octyl, 2-(1-adamantyl)-ethyl, 2-phenylethyl and 2-(9-carbazolyl)ethyl.

The value of n is between 1 and 20.

The second type of polyimide forming the subject of the invention is a polyimide derived from pyromellitic anhydride (PMDA) and from 2,2-bis(3-amino-4-hydroxy-phenyl)hexafluoropropane (Bis-AP-AF) of formula (II) in which the radicals $R_3$ and $R_4$, which are identical or different, have the same meaning as the radicals $R_1$ and $R_2$ described above. The value of n is the same as that given above.

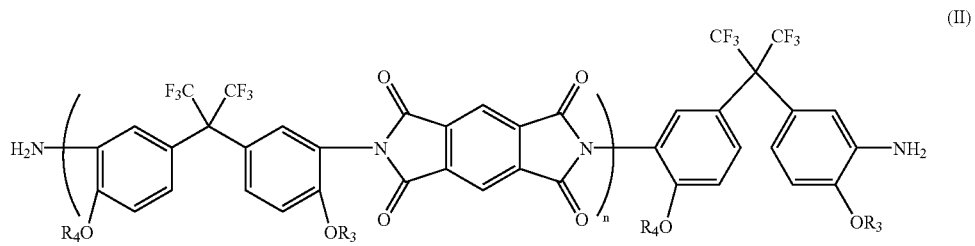

(II)

Copolymers derived from the polyimides (I) and (II) also fall within the polymers according to the invention.

The polymers according to the invention are used in the manner described below. The polymers are deposited on the substrate by spin coating a solution. The suitable solvents are, for example: THF, N-methylpyrrolidone (NMP), dioxane, dimethyl sulfoxide (DMSO), butyrolactone and dimethylformamide (DMF).

After annealing at a temperature of between 100 and 230° C., preferably 200° C., for a time of between a few minutes and 2 hours, advantageously around 1 hour, the polymer layer is rubbed with a fabric roller (azimuthal orientation).

The layers are in general produced on a conventional ITO substrate, but other electrodes may be envisioned.

In an alternative version of the invention, the azimuthal orientation of the anchoring layer may be obtained by methods other than by rubbing with a fabric roller, for example using a substrate pre treated:

by oblique evaporation of SiO;
by a drawn polymer;
by a grating which is etched into the substrate, printed or photoinduced.

The method according to the present invention allows a low-energy zenithal anchoring alignment layer to be obtained.

Examples of polymers illustrating the invention are described below.

EXAMPLE 1

Preparation of the Polymers a) Polymers of type I:

This family of polymers was synthesized from the dihydroxypolyimide of formula (1a) given below. It is also known and described in T. Chen, A. Jen and Y. Cai, *Macromolecules*, 1996, 29, 535–539.

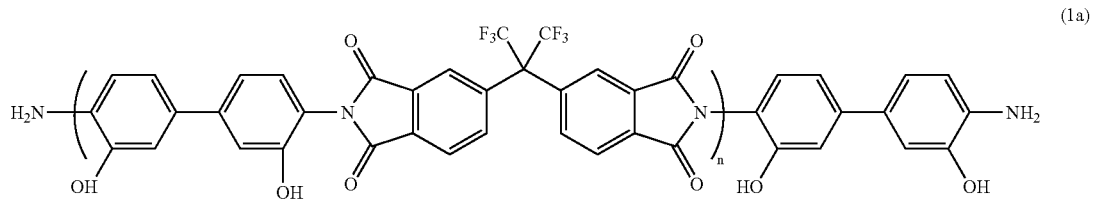

(1a)

b) Polymers of Type II:

This family of polymers was synthesized from the dihydroxypolyimide of formula (2a) shown below, this being known and described in T.Chen, A. Jen and Y. Cai, *Macromolecules*, 1996, 29, 535–539:

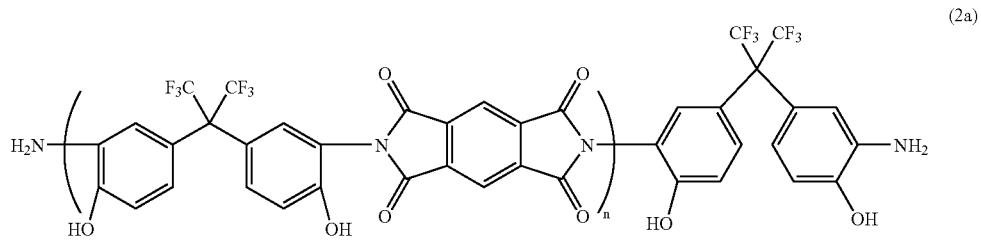

(2a)

The hydroxypolyimides (1a) and (2a) were then grafted by a Mitsunobu reaction. This reaction makes it possible to graft, using a method known to those skilled in the art, defined side groups onto the hydroxyl groups of compound (1a) and (2a). A description of this method will be found in the book *Organic reactions* Vol.42 (1992). For side chains, various alcohols with a linear or branched chain or with a terminal group are used, a few examples of which are given below as an indication.

The numbers in the brackets indicate the substituted polyimides I and II respectively.

A few of the properties, such as the decomposition temperatures and glass transition temperatures, are given as examples in table II.

TABLE I

Polyimides I and II.

| Substituents R1 = R2 = R3 = R4 | Reference | |
|---|---|---|
| n-octyl | (1b); (2b) | |
| n-dodecyl | (1c); (2c) | |
| n-octadecyl | (1d); (2d) | |
| 2-(ethyl)hexyl | (1e); (2e) | |
| 2-(phenyl)ethyl | (1f); (2f) | |
| 8-(phenyl)octyl | (1g); (2g) | |
| 2-(cyclohexyl)ethyl | (1h); (2h) | |
| 2-(1-adamantyl)ethyl | (1i); (2i) | |
| 2-(9-carbazolyl)ethyl | (1j); (2j) | |

TABLE II

| Series II polymer | Decomposition temperature | Glass transition temperature |
|---|---|---|
| 2a | 370° C. | n.d. |
| 2b | 270° C. | 126° C. |
| 2c | 250° C. | 89° C. |
| 2d | 250° C. | 74° C. |
| 2e | 270° C. | n.d. |
| 2f | 270° C. | n.d. |
| 2g | 240° C. | n.d. |
| 2h | 260° C. | n.d. |

Examples of decomposition temperatures and glass transition temperatures of the polymers of the invention (experimental conditions: temperature rise from 30 to 600° C., at 10° C./min in air).
n.d.: not determined.

EXAMPLE 2

Synthesis of Polyimide 2c

The chain grafting reaction was carried out in argon. 548 mg (1 mmol, 1 eq) of compound 2a [synthesized according to the method described by D. Yu, A. Garani and L. Yu in *J.Am.Chem.Soc.* 117, 11680(1995)], 550 mg (3 mmol, 3 eq) of dodecan-1-ol and 880 mg (3.35 mmol, 3.35 eq) of triphenylphosphine were dissolved in 30 ml of distilled tetrahydrofuran (THF). The mixture was stirred until the reactants had completely dissolved and then 0.4 ml (3 mmol, 3 eq) of diethyl azodicarboxylate (commonly called DEAD) was added drop by drop to the solution, which was cooled to 0° C. An orange precipitate immediately formed. The mixture was then taken to reflux at 70° C.; the precipitate progressively redissolved as the temperature of the mixture rose (the precipitate was immediately dissolved above 50° C.) and the solution returned to its initial yellow color.

After 4 days of reflux at 70° C., the solution was precipitated by adding it drop by drop to 400 ml of a 50/50 methanol/water mixture with 1% hydrochloric acid. The product collected by filtration was redissolved in 30 ml of distilled THF and then stirred for 24 hours. To thoroughly purify the grafted product and extract the ungrafted alkyl chains therefrom, two successive precipitation/redissolving operations were performed (the progress of the purification was monitored by $^1$H NMR). The last reprecipitation was carried out in ethanol instead of the methanol/water mixture. The product obtained was finally vacuum-dried for 24 hours at 60° C. $^1$H NMR: (200 MHz, $CDCl_3$) (FIG. 1): 8.46 (s,2H), 7.47 (d,2H), 7.40 (s,2H), 7.06 (s,2H, J=8.8 $H_z$), 4.03 (t, 4H, —O—$CH_2$), 1.65 (m, 4H, $C_\beta H_2$), 1.22 (m, 36H, $CH_2$), 0.83 (t, 6H, $CH_3$); $^{13}$C NMR (50 MHz, $CDCl_3$) (FIG. 2): 164.75, 155.18, 137.32, 133.17, 131.69, 124.83, 121.04, 119.47, 119.17, 112.54, 68.82, 31.87, 31.84, 29.62, 29.51, 29.47, 29.32, 29.28, 29.12, 29.06, 28.72, 25.64, 22.64, 14.07;

Calculated elemental composition for a 100% $C_{12}$-grafted polyimide chain: C, 66.48; H, 6.61; N, 3.17; O, 10.85; F, 12.89; measured elemental composition: C, 65.91; H, 6.13; N, 3.21; degree of grafting 92±2%; Decomposition onset temperature: 250° C.

BRIEF DESCRIPTION OF THE DRAWINGS

FIG. 1 shows the $^1$H NMR ($CD_2Cl_2$, 200 MHz) spectrum of polyimide 2c.

FIG. 2 shows the $^{13}$C NMR (50 MHz, $CDCl_3$) spectrum of polyimide 2c.

EXAMPLE 3

Figure 1:
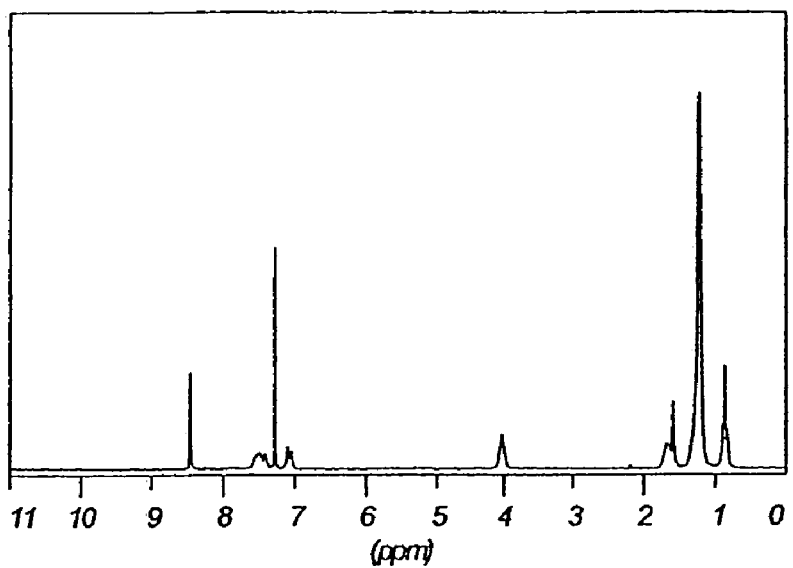
FIGS. 1 and 2 give the NMR spectra obtained for polyimide 2c after various purifications.
Figure 2:
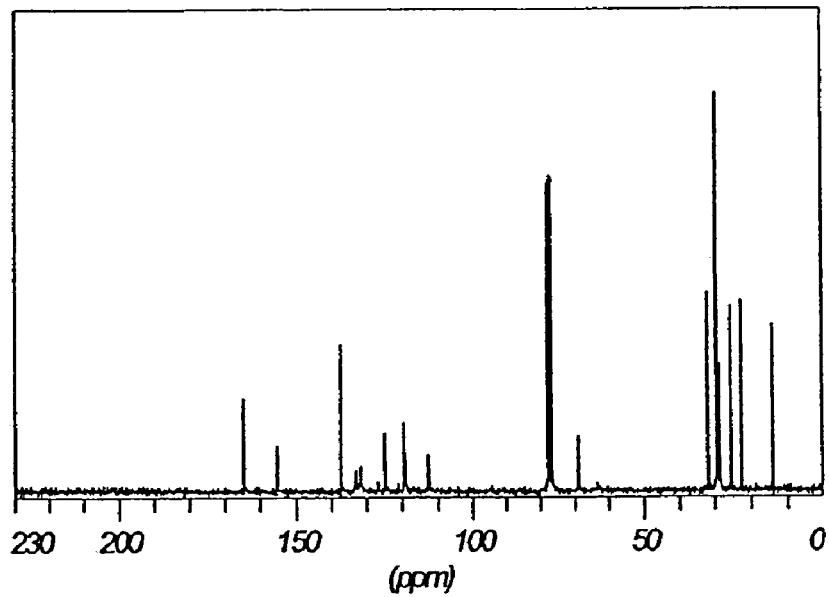

Preparation of a Liquid-crystal Cell a) A first example was used to mount a liquid-crystal cell (with 5CB) 1.5 microns in thickness between two ITO-coated glass plates. One of them was subjected to SiO evaporation (thickness 107 nm and angle of incidence: 82.5°) in order to give a strong azimuthal anchoring. The other was coated with the polyimide with the reference 2 h, prepared according to example 1 (family II; substituents $R_3=R_4=$2-(cyclohexyl) ethyl):

Step 1: deposition of the polymer by spin coating a 1 wt % solution in dioxane;

Step 2: annealing at 200° C. for 1 h;

Step 3: brushing with a velvet roller (to induce the azimuthal alignment)

The two plates described were joined together to form a BINEM® cell manufactured by Nemoptic. The cell was filled with doped 5CB liquid crystal (chiral pitch: 6.13 microns). The cell operated with pulses of 18 volts, with a contrast of 20 to 22°.

b) According to another example of the invention, the liquid crystal used was a mixture suitable for the BINEM® technology, the operating range of which extended from 18° to more than 60° for control pulces of 18 volts.

The weak planar anchoring according to the invention had the following characteristics:

the alignment layers were chemically and mechanically stable over time when in contact with the mixtures of liquid crystals used;

the anchoring was planar, to within the accuracy of the measurements used, therefore less than 0.2°;

the zenithal anchoring force, measured by a high-field technique, for 5CB at a temperature of 22° C. was about $L_z$=35 nm—it varied little with the polymer used according to the invention.

Several commercial nematic mixtures were tested and the extrapolation lengths varied from 30 to 60 nm depending on the nematic and the temperature. These values correspond to much lower zenithal anchoring energies than those obtained with the conventional polymers used in displays.

The force of the azimuthal anchoring obtained depends on the treatment carried out on the layers, for example, azimuthal extrapolation lengths of between 50 and 200 nm were obtained by brushing. After brushing, the azimuthal anchoring force was $L_a$=120 nm for the compound 2 h. These values are compatible with the operation of BINEM® cells.

In particular, the present invention has the following advantages: the low-energy anchoring according to the prior art, that is to say with a silicon oxide SiO layer, is achieved by a vacuum process. The vacuum deposition process is lengthy and expensive and is also difficult to control.

Compared with the known process for achieving low-energy anchoring, the use of a polymer layer according to the present invention affords the appreciable advantages of simplicity and lower manufacturing cost.

Of course, the invention is not limited to the particular embodiments that have just been described, but extends to all alternative forms in accordance with its spirit.

What is claimed is:

1. Polyimides for producing low-energy anchoring layers in nematic liquid-crystal cells, according to the following types:

polyimide derived from 2,2'-bis (3,4-dicarboxyphenyl) hexafluoropropane dianhydride (6FDA) and from 3,3'-dihydroxy-4, 4' diaminobiphenyl of formula I:

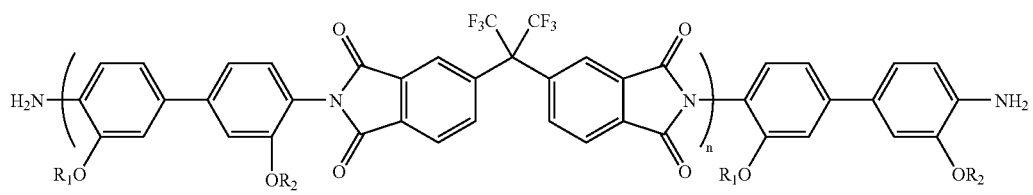

in which the radicals $R_1$ and $R_2$, which are identical or different, represent an alkyl, arylalkyl, heteroarylalkyl, (cycloalkyl)alkyl, fluoroalkyl or siloxane radical and n is between 1 and 20;

polyimide derived from pyromellitic anhydride (PMDA) and from 2,2-bis (3-amino-4-hydroxyphenyl)hexafluoropropane (Bis-AP-AF) of formula II.

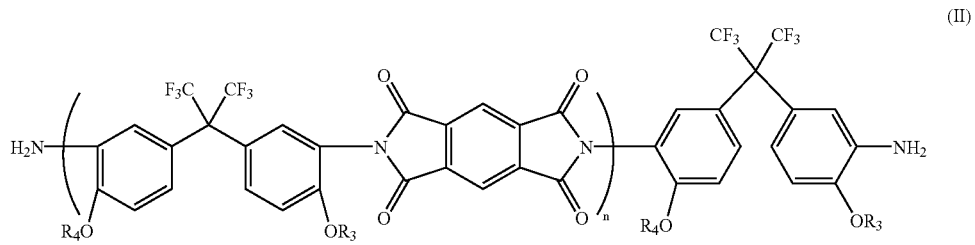

in which the radicals $R_3$ and $R_4$, which are identical or different, have the same meaning as $R_1$ and $R_2$ and n is between 1 and 20; and copolymers of polyimide (I) and of polyimide (II).

2. The polyimides as claimed in claim 1, wherein the radicals $R_1$ and $R_2$ are identical and the radicals $R_3$ and $R_4$ are identical and represent independently of one another:
a $C_8$ and $C_{18}$ alkyl; or
2-(1-adamantyl)ethyl or 2-(cyclohexyl)ethyl; or
a phenyl alkyl, especially 8-phenyl octyl or 2-phenyl ethyl; or 2-(9-carbazolyl) ethyl.

3. The polyimides of formula (II) as claimed in claim 2, wherein the radicals $R_3$ and $R_4$ and the radicals $R_1$ and $R_2$ are identical and represent n-dodecyl or 2-(cyclohexyl) ethyl.

4. A method for producing nematic liquid-crystal cells with confining plates, which comprises the steps of:
depositing a polyimide as claimed in claim 1 on a substrate;
annealing the polyimide in one or more steps at a temperature of between 100° C. and 230° C. for a time of between a few minutes and 2 hours; and
defining an azimuthal orientation of the polyimide coating, inducing control of azimuthal anchoring of the liquid crystal in order to obtain a low zenithal anchoring energy of the liquid crystal on at least one of its confining plates.

5. The method as claimed in claim 4, wherein one or more annealing operations are carried out during the various steps before or after the step consisting in defining the controlled azimuthal anchoring of the liquid crystal.

6. The method as claimed in claim 4, wherein the annealing is carried out at a temperature of around 200° C. for one hour.

7. The method as claimed in claim 4, wherein the step of azimuthally orienting the liquid crystal is provided by rubbing the polyimide with a fabric roller.

8. The method as claimed in claim 4, wherein the step of defining the controlled azimuthal anchoring of the liquid crystal is provided by depositing the polyimide on a substrate already made anisotropic by a particular treatment, such as another drawn polymer, SiO or another evaporated oxide, or a grating which is etched in the substrate, printed or photoinduced.

9. The method as claimed in claim 4, wherein the polyimide is deposited on a substrate by spin coating.

10. The method as claimed in claim 4, characterized in that the polyimide is deposited in solution in a solvent based on dioxane, tetrahydrofurane, N-methylpyrrolidone, dimethyl sulfoxide or dimethylfonnamide.

11. The method as claimed in claim 4, wherein the thickness of the polyimide coating is between a few nanometers and 100 nm.

12. A bistable nematic liquid-crystal device using at least one low-energy anchoring layer produced according to the method as claimed in claim 4.

13. The device as claimed in claim 12, wherein the anchoring layer is deposited on a transparent or reflecting electrode.

14. The bistable nematic liquid-crystal device comprising at least one confining plate on which a substrate comprising a polyimide as claimed in claim 1 is deposited.

15. A method of preparing polyimides as claimed in claim 1, which employs a Mitsunobu reaction.

16. The polyimides as claimed in claim 2, wherein the $C_8$ and $C_{18}$ alkyl are selected from the group consisting of n-octyl, n-dodecyl, n-octadecyl and 2-(ethyl)hexyl.

* * * * *

UNITED STATES PATENT AND TRADEMARK OFFICE
CERTIFICATE OF CORRECTION

PATENT NO. : 7,022,809 B2 Page 1 of 1
APPLICATION NO. : 10/479274
DATED : April 4, 2006
INVENTOR(S) : Lamarque et al.

It is certified that error appears in the above-identified patent and that said Letters Patent is hereby corrected as shown below:

On the title page Item [75], Inventors, insert -- Jacques Le Moigne, Strasbourg (FR); Ivan N. Dozov, Gifsuryvette (FR) --.

Signed and Sealed this

Sixth Day of March, 2007

JON W. DUDAS
*Director of the United States Patent and Trademark Office*